United States Patent
Ivey et al.

(10) Patent No.: US 10,636,162 B2
(45) Date of Patent: Apr. 28, 2020

(54) PATTERN RECORDER FOR STRATEGICALLY HIDDEN SPEAKERS SYSTEM

(71) Applicant: Mitek Corp., Inc., Phoenix, AZ (US)

(72) Inventors: Johnathan Ivey, Chandler, AZ (US); Kevin Sykes, Phoenix, AZ (US); Tyler Jo Keller, Tempe, AZ (US); Cristian Botos, Phoenix, AZ (US)

(*) Notice: Subject to any disclaimer, the term of this patent is extended or adjusted under 35 U.S.C. 154(b) by 62 days.

(21) Appl. No.: 16/137,540

(22) Filed: Sep. 21, 2018

(65) Prior Publication Data

US 2019/0087974 A1 Mar. 21, 2019

Related U.S. Application Data

(63) Continuation-in-part of application No. 15/902,446, filed on Feb. 22, 2018, now Pat. No. 10,446,131, which is a continuation-in-part of application No. 15/710,654, filed on Sep. 20, 2017, now Pat. No. 10,237,636.

(51) Int. Cl.

| | |
|---|---|
| *H04R 1/20* | (2006.01) |
| *G06T 7/70* | (2017.01) |
| *G06T 7/90* | (2017.01) |
| *H04R 31/00* | (2006.01) |
| *G01J 3/46* | (2006.01) |
| *G01J 3/00* | (2006.01) |
| *G01J 3/02* | (2006.01) |
| *G01J 3/52* | (2006.01) |

(52) U.S. Cl.
CPC ............ *G06T 7/70* (2017.01); *G01J 3/00* (2013.01); *G01J 3/0264* (2013.01); *G01J 3/0272* (2013.01); *G01J 3/463* (2013.01); *G01J 3/526* (2013.01); *G06T 7/90* (2017.01); *H04R 31/00* (2013.01)

(58) Field of Classification Search
CPC .................................................. H04R 1/20
See application file for complete search history.

(56) References Cited

U.S. PATENT DOCUMENTS

| | | | | |
|---|---|---|---|---|
| 6,142,254 | A * | 11/2000 | Claybaugh | H04R 1/023 181/141 |
| 2001/0017089 | A1* | 8/2001 | Fujii | B41F 17/00 101/484 |
| 2004/0028397 | A1* | 2/2004 | Maekawa | G03B 17/53 396/2 |
| 2006/0234016 | A1* | 10/2006 | Neill | B44C 1/28 428/195.1 |
| 2017/0348978 | A1* | 12/2017 | Van Garsse | B41M 5/00 |

* cited by examiner

*Primary Examiner* — Olisa Anwah
(74) *Attorney, Agent, or Firm* — Keith L. Jenkins, Registered Patent Attorney, LLC; Keith L. Jenkins

(57) ABSTRACT

A smart phone with an application for electronically photographing a section of a patterned ceiling along with a color and grayscale calibration template surrounding the small speaker system installation site, storing the image, uploading the image to a computer that has color correction software, correcting the color of the image, and printing the image on a steel ring and a steel disc for magnetic attachment to a diffuser of a small ceiling speaker system.

20 Claims, 15 Drawing Sheets

PATTERN RECORDER FOR STRATEGICALLY HIDDEN SPEAKERS SYSTEM

RELATED PATENT APPLICATIONS

This application is a continuation in part of U.S. patent application Ser. No. 15/902,446 filed Feb. 22, 2018 by at least one common inventor which is a continuation in part of U.S. patent application Ser. No. 15/710,654 filed Sep. 20, 2017 by at least one common inventor.

FIELD OF ART

The present invention relates to a system for recording patterns found on ceilings at installation points for the small speaker systems of U.S. patent application Ser. Nos. 15/902,446 and 15/710,654. The present invention particularly relates to a smart phone with an application for electronically photographing a section of a patterned ceiling and a color and grayscale calibration template, storing the image, uploading the image to a computer that has color correction software, correcting the color of the image, and printing the image on a ring and a disc for magnetic attachment to a diffuser of a small speaker system.

BACKGROUND OF THE INVENTION

Ceiling-mounted speakers are frequently used in office complexes and schools. While a variety of audio systems above the ceiling have been developed, the appearance of ceiling speakers has not changed in decades. While size may vary, typical ceiling speakers still look, from the point of view of people in the room below the ceiling, the same as they have for decades: a frame surrounding a speaker grill. This monotony limits the options of architects and interior designers in creating comfortable spaces. Applicant has filed patent applications for a number of aspects of a "strategically hidden loudspeaker system" (hereinafter "SHS") and recognizes a need for a system for reliably recording a ceiling pattern despite varying color influences from various types of illumination at a worksite.

SUMMARY OF THE INVENTION

To solve that problem, applicant discloses a smart phone with an application for electronically photographing a section of a patterned ceiling along with a color and grayscale calibration template surrounding the installation site, storing the image, uploading the image to a computer that has color correction software, correcting the color of the image, and printing the image on a steel ring and a steel disc for magnetic attachment to a diffuser of a small ceiling speaker system.

DESCRIPTION OF THE FIGURES OF THE DRAWINGS

The present invention will hereinafter be described in conjunction with the following drawing figures, wherein like numerals denote like elements.

DETAILED DESCRIPTION OF THE INVENTION

As used and defined herein directional words such as "down," "downward," "up", "upper," "top", "bottom", etc. are referenced to the operational orientation of the invention. As used and defined herein, "printed", and its derivative words, refers to a physical layer of one or more colorants on at least a portion of a surface.

Figure 1:
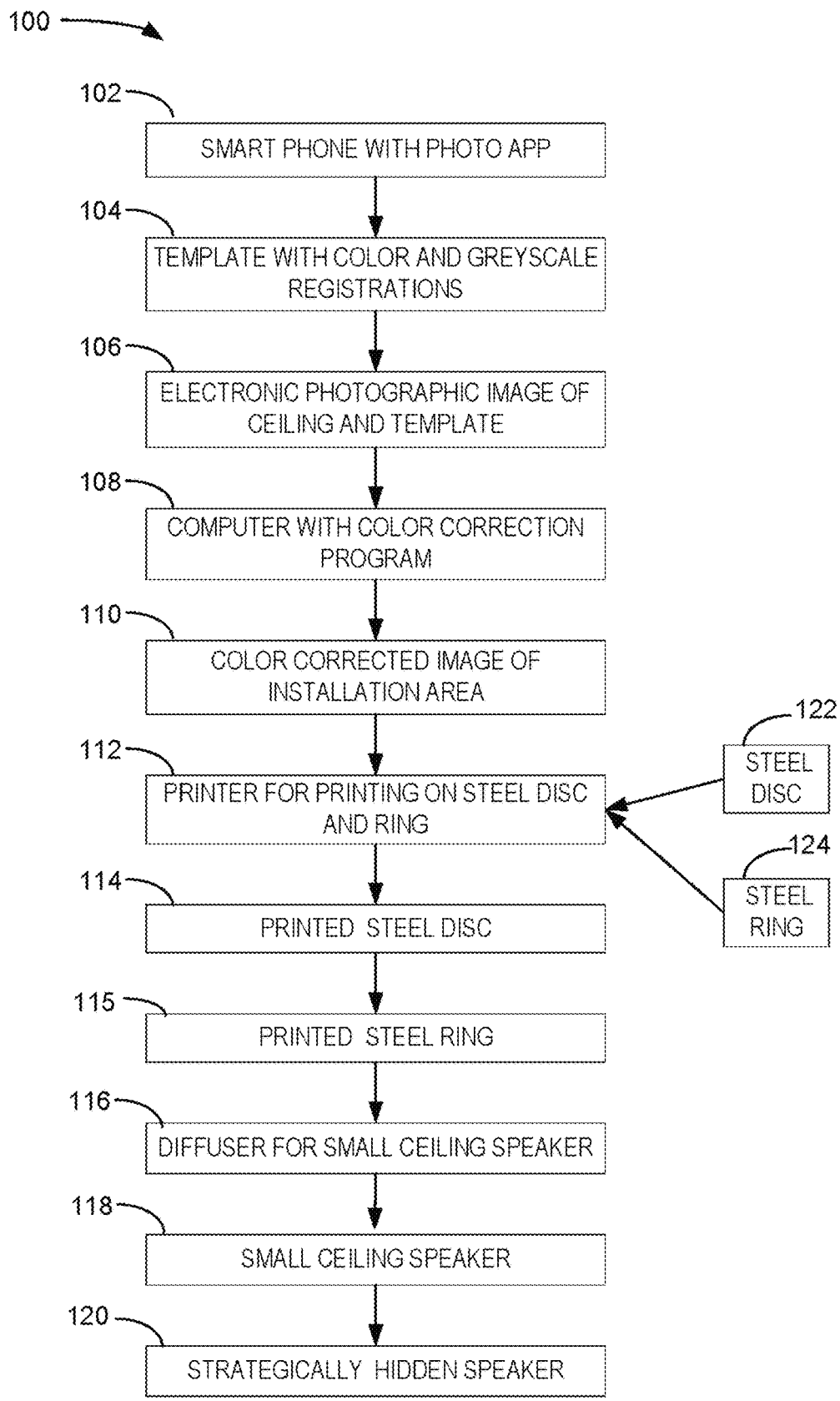
FIG. 1 is a diagrammatic view illustrating an exemplary embodiment of the apparatus of the pattern recorder for strategically hidden speakers system, according to a preferred embodiment of the present invention.

FIG. 1 is a diagrammatic view illustrating an exemplary embodiment of the apparatus of the pattern recorder for strategically hidden speakers system 100, according to a preferred embodiment of the present invention. The smart phone with a photographic application 102, including a camera 602 (see FIG. 6) will be discussed in greater detail below. Any phone smart enough to take twelve-megapixel photographs or better, and which can transfer data over the internet, is smart enough to be smart phone 102. The color and greyscale calibration template 104 surrounds the ceiling area 808 (see FIG. 8) designated for the SHS installation as will be discussed in detail in regard to FIG. 7 and FIG. 8. The electronic photographic image 106 includes the color and greyscale calibration template 104 and the ceiling area 808 (see FIG. 8), as will be discussed in more detail in regard to FIG. 8. The computer 108 with a color correction program 616 (see FIG. 6) may be any computer capable of receiving uploaded data and having in permanent memory the software 616 for performing color correction. A color-corrected image 110 of the installation area is stored in the computer 108 until it is sent to the printer 112 which is specially adapted for printing on steel. A steel disc 122 having the diameter of the diffuser element 1206 is provided to the printer, as is an annular steel ring 124 having an inner diameter corresponding to the outer diameter of rim 1308 on acoustic channel interface 1208 and an outer diameter equal to the diameter of flange 1312 on acoustic channel interface 1208. The result of the printing is typically a printed steel disc 114 and a printed steel ring 115, each having an appropriate portion of the color-corrected image 110. The printed steel disc 114 and the printed steel ring 115 are magnetically attached to diffuser 116 and installed on a small ceiling speaker 118 to form an SHS 120.

Figure 2:
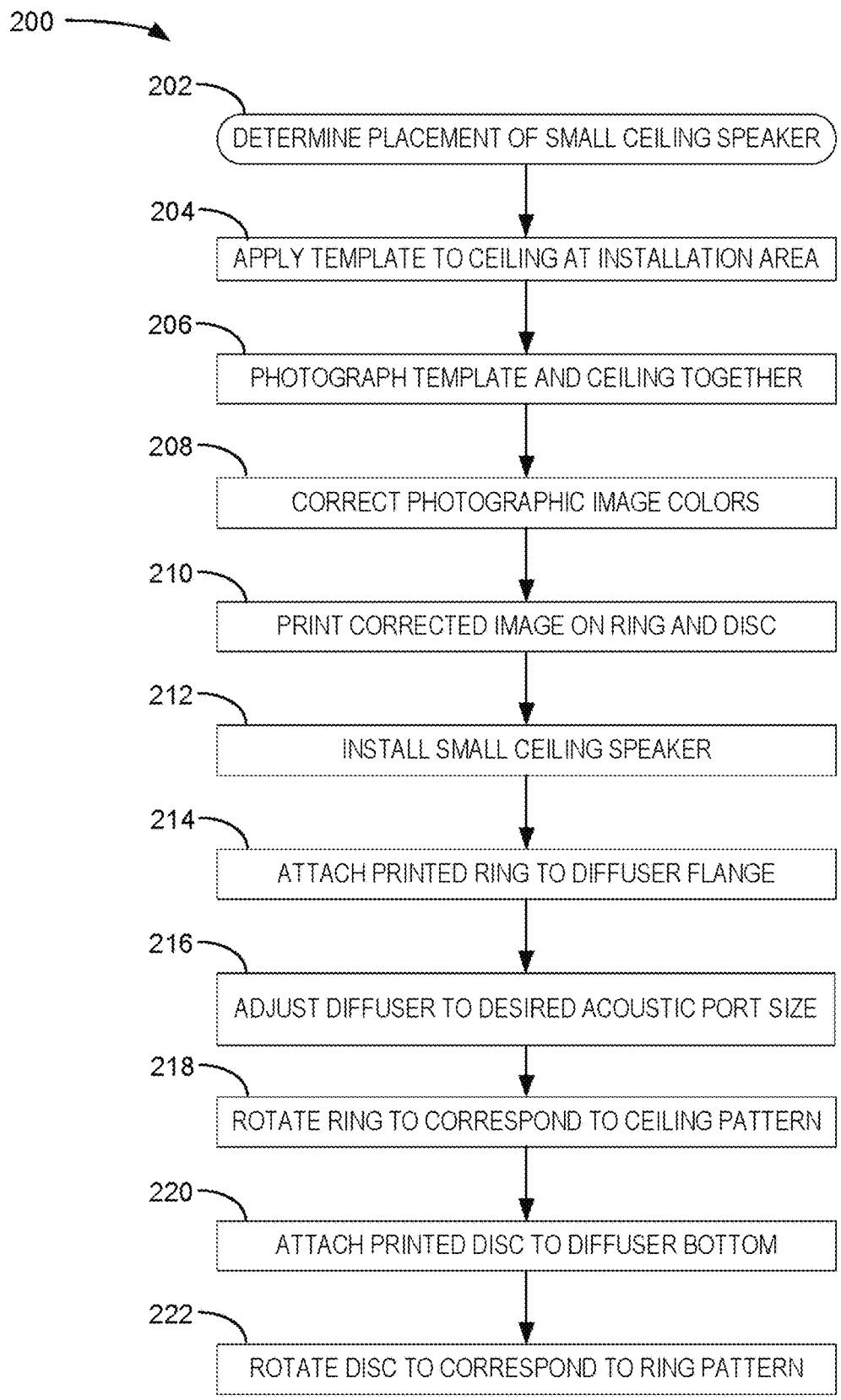
FIG. 2 is a diagrammatic view illustrating the exemplary embodiment of the method of use of the pattern recorder for strategically hidden speakers system of FIG. 1, according to a preferred embodiment of the present invention.

FIG. 2 is a diagrammatic view illustrating the exemplary embodiment of the method 200 of use of the pattern recorder for strategically hidden speakers system 100 of FIG. 1, according to a preferred embodiment of the present invention. In step 202, the position for the placement of the SHS is determined, usually as part of a larger facility acoustic plan. Once the position has been determined, and adhesively-backed color and greyscale calibration template 104 is adhered to the ceiling 802 (see FIG. 8) in step 204. In step 206, the template 104 and the ceiling 802 proximate the template 104 is electronically photographed. The electronic photograph is uploaded to a computer 108 with color correction software 616, and the colors are corrected in step 208. In step 210, the corrected image is printed on disc 122 to make printed disc 114 and the corrected image is printed on ring 124 to make printed ring 115. In step 212, the Small ceiling speaker system 118 is installed in ceiling 802 (see FIGS. 2, 8, 14, and 15). In step 214 the printed ring 115 is magnetically attached to the bottom surface 1304 (see FIG. 13) using magnets 1302 that are preferably flush mounted in flange 1312. In step 216, the diffuser element 1206 is installed in acoustic interface 1208 (see FIG. 12) and adjusted to a predetermined acoustic port size, according to the facility acoustic plan. Printed ring 115 is rotated into alignment with the ceiling pattern 804 (see FIG. 8) in step 218. In step 220, printed disc 114 is magnetically attached to the bottom of diffuser element 1206 using magnets 1306. In step 222, printed disc 114 is rotated to align with the pattern on printed ring 115.

Figure 3:
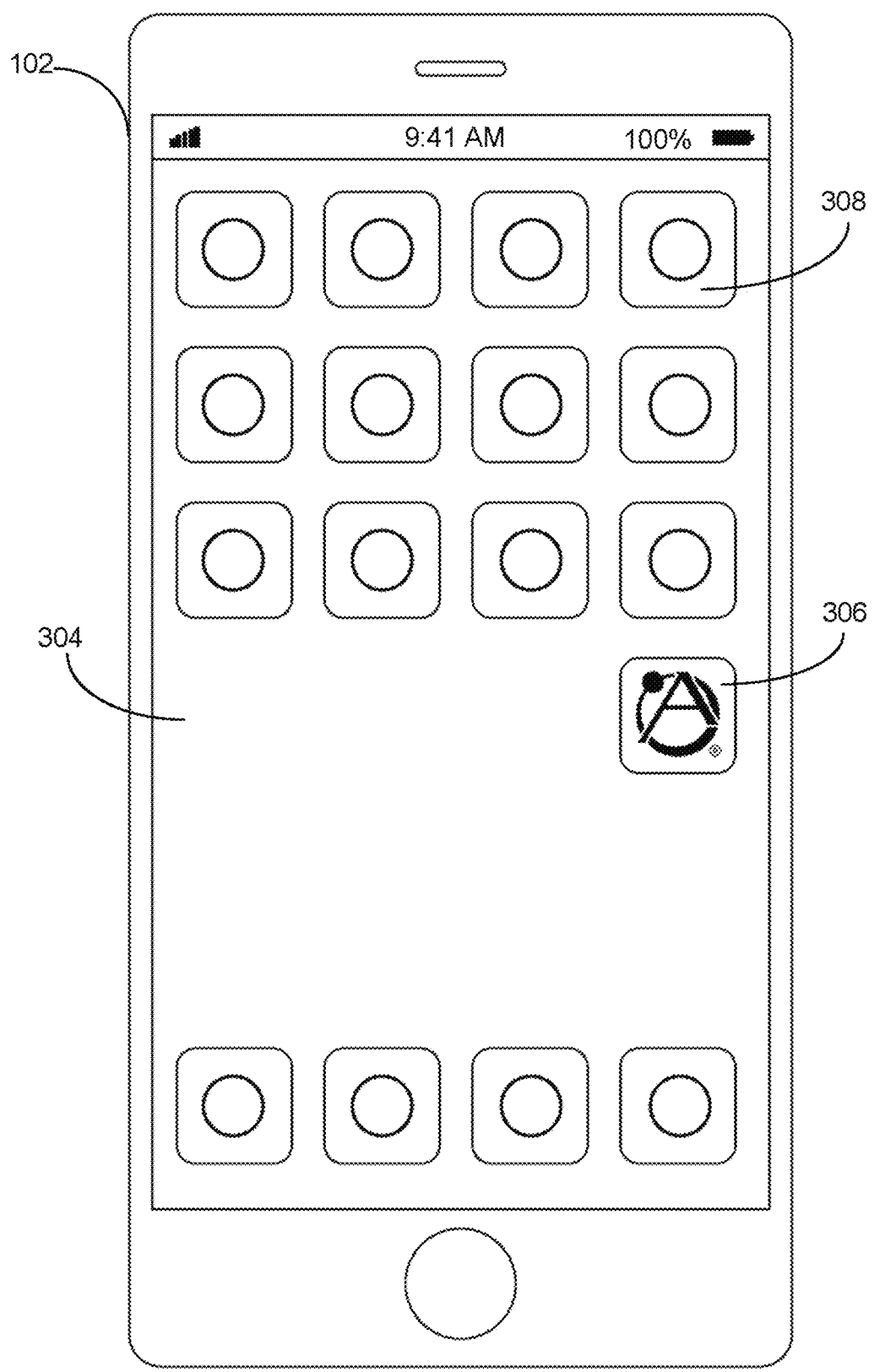
FIG. 3 is a front diagrammatic view illustrating the exemplary embodiment of a first smart phone screen of the pattern recorder for strategically hidden speakers system of FIG. 1, according to a preferred embodiment of the present invention.

FIG. 3 is a front diagrammatic view illustrating the exemplary embodiment of a first smart phone screen 304 of the pattern recorder for strategically hidden speakers system 100 of FIG. 1, according to a preferred embodiment of the present invention. First screen 304 presents a plurality of various icons 308 (one of sixteen labeled) and an icon 306 for initiating photographic recording of a ceiling pattern 804 and a color calibration template 104.

Figure 4:
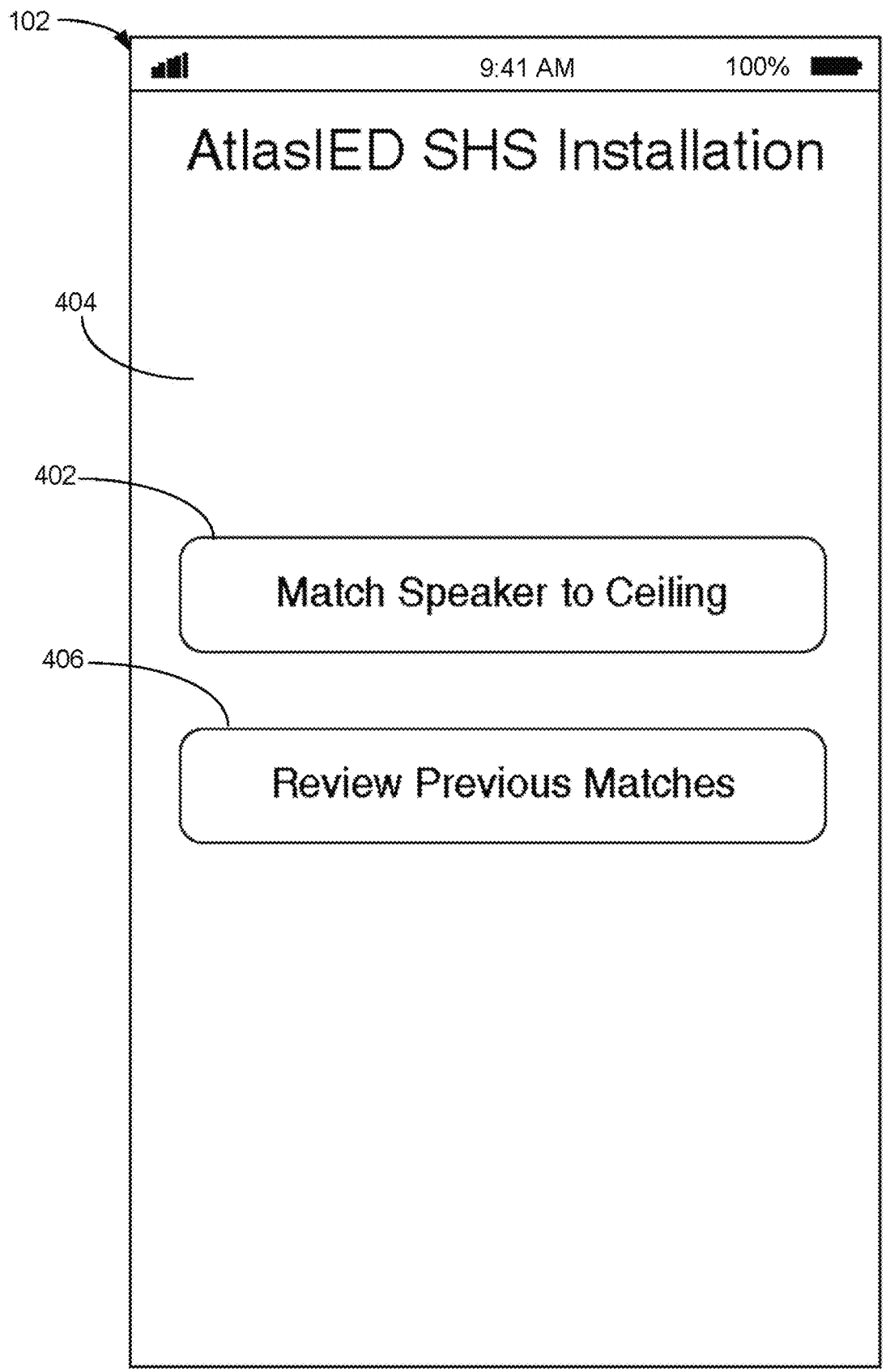
FIG. 4 is a front diagrammatic view illustrating the exemplary embodiment of a second smart phone screen of the pattern recorder for strategically hidden speakers system of FIG. 1, according to a preferred embodiment of the present invention.

FIG. 4 is a front diagrammatic view illustrating the exemplary embodiment of a second smart phone screen 404 of the pattern recorder for strategically hidden speakers system 100 of FIG. 1, according to a preferred embodiment of the present invention. Responsive controls 402 and 404 give the user the option of proceeding with obtaining a photograph 402 or reviewing previous images to see if one is appropriate.

Figure 5:
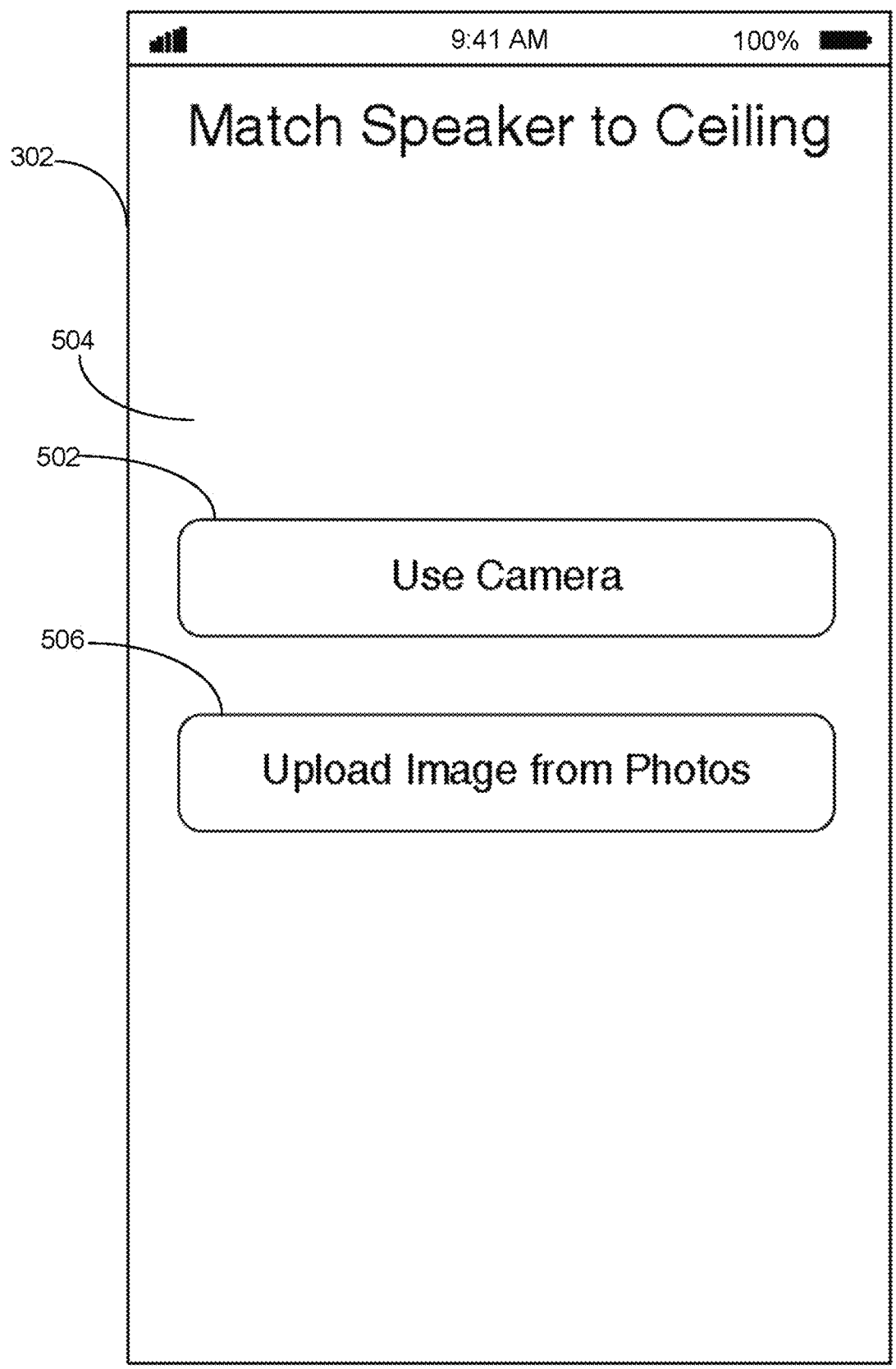
FIG. 5 is a front diagrammatic view illustrating the exemplary embodiment of a third smart phone screen of the pattern recorder for strategically hidden speakers system of FIG. 1, according to a preferred embodiment of the present invention.

FIG. 5 is a front diagrammatic view illustrating the exemplary embodiment of a third smart phone screen 504 of the pattern recorder for strategically hidden speakers system 100 of FIG. 1, according to a preferred embodiment of the present invention. Responsive controls 502 and 504 give the user the option of proceeding with making a new photograph 502 or uploading previous images to computer 108 for processing.

Figure 6:
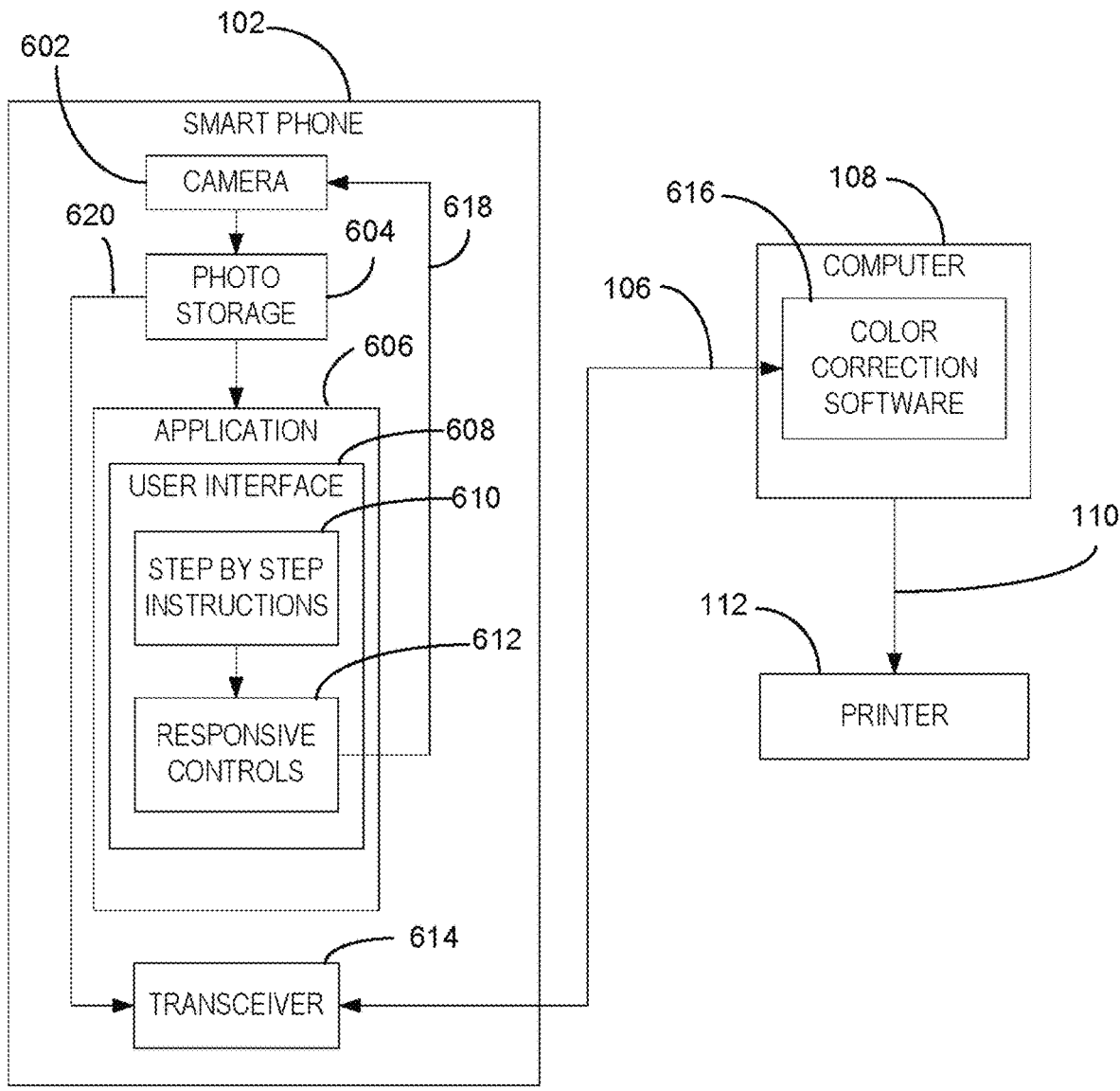
FIG. 6 is a diagrammatic view illustrating the exemplary embodiment of exemplary data paths of the pattern recorder for strategically hidden speakers system of FIG. 1, according to a preferred embodiment of the present invention.

FIG. 6 is a diagrammatic view illustrating the exemplary embodiment of exemplary data paths of the pattern recorder for strategically hidden speakers system 100 of FIG. 1, according to a preferred embodiment of the present invention. The smart phone 102, by definition, has an integral camera 602; photo storage 604 that receives data from the camera 602; and a transceiver 614 for transmitting and receiving data, such as electronic images 106 of the template 104 and the ceiling 802 proximate thereto. Uniquely, smart phone 102 has a software application 606, or program 606, that includes step-by-step instructions 610 (see FIGS. 3-5) for the pattern recording process and receives user input through responsive controls 612. One responsive control 502 data path 618 is to click the shutter on the camera 602. Transceiver 614 receives data from photo storage 604, responsive to control 506. Electronic images 106 are sent to computer 108, are processed by the color correction software 616. Color corrected images 110 are sent to the printer 112.

Figure 7:
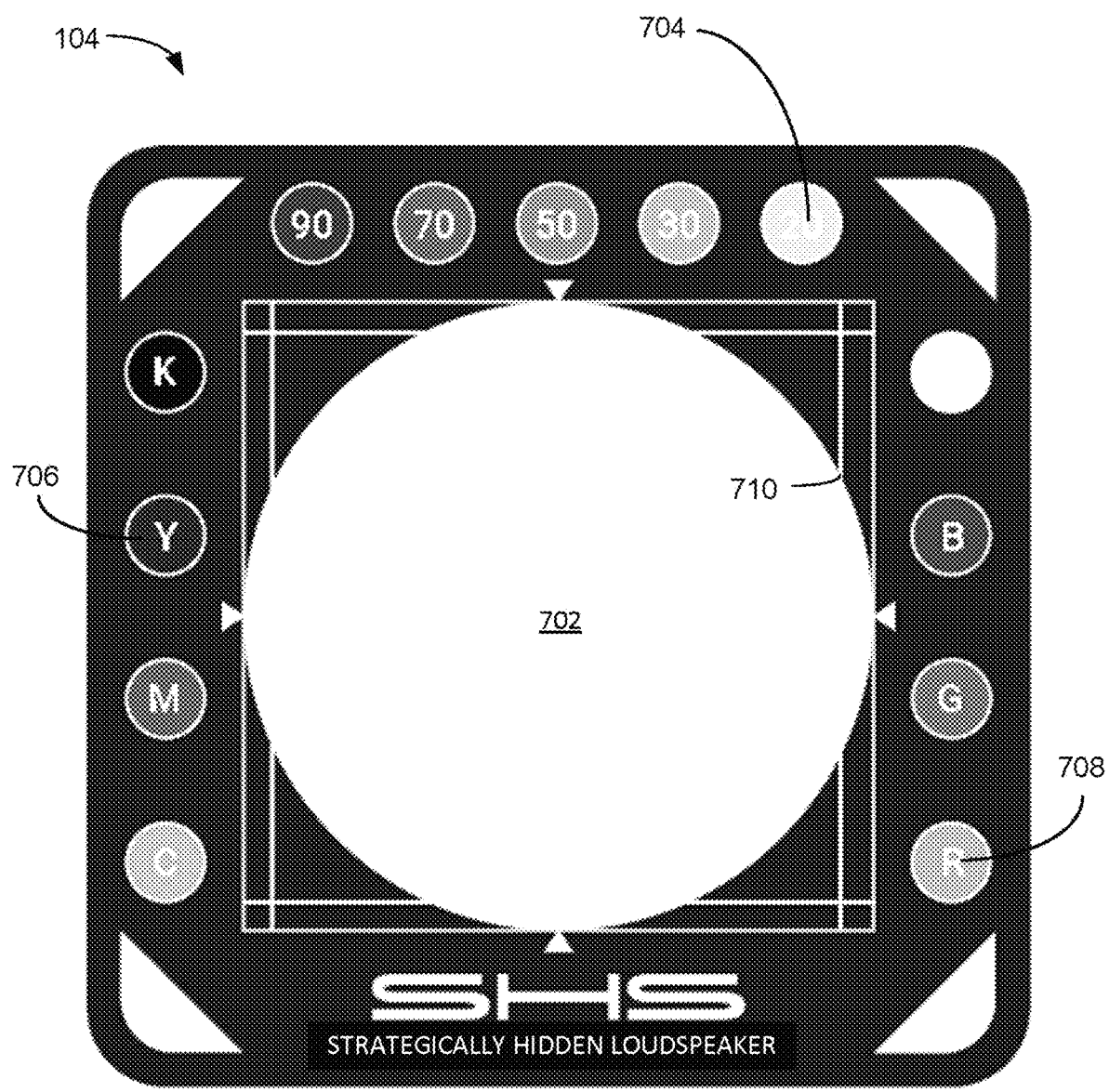
FIG. 7 is a bottom plan view illustrating the exemplary embodiment of an exemplary color calibration template of the pattern recorder for strategically hidden speakers system of FIG. 1, according to a preferred embodiment of the present invention.

FIG. 7 is a bottom plan view illustrating the exemplary embodiment of an exemplary color calibration template 104 of the pattern recorder for strategically hidden speakers system 100 of FIG. 1, according to a preferred embodiment of the present invention. Template 104 has a central opening 702 through which ceiling portion 808 (see FIG. 8) may be seen and photographed 206. Greyscale references 704 (one of five labeled) enable greyscale correction. Red, green, blue (RGB) references 708 (one of three labeled) provide an additive color scheme for correcting colors. Cyan, magenta, yellow, and black (CMYK) provides a subtractive color scheme for correcting colors, which is preferred for printing. The template 104 also acts to capture the photo at the correct scale, the circular opening 702 and squared lines 710 (one of eight labeled) aid in cropping the image at a 1:1 size so it prints correctly. Template 104 preferably has a releasable adhesive on its back surface.

Figure 8:
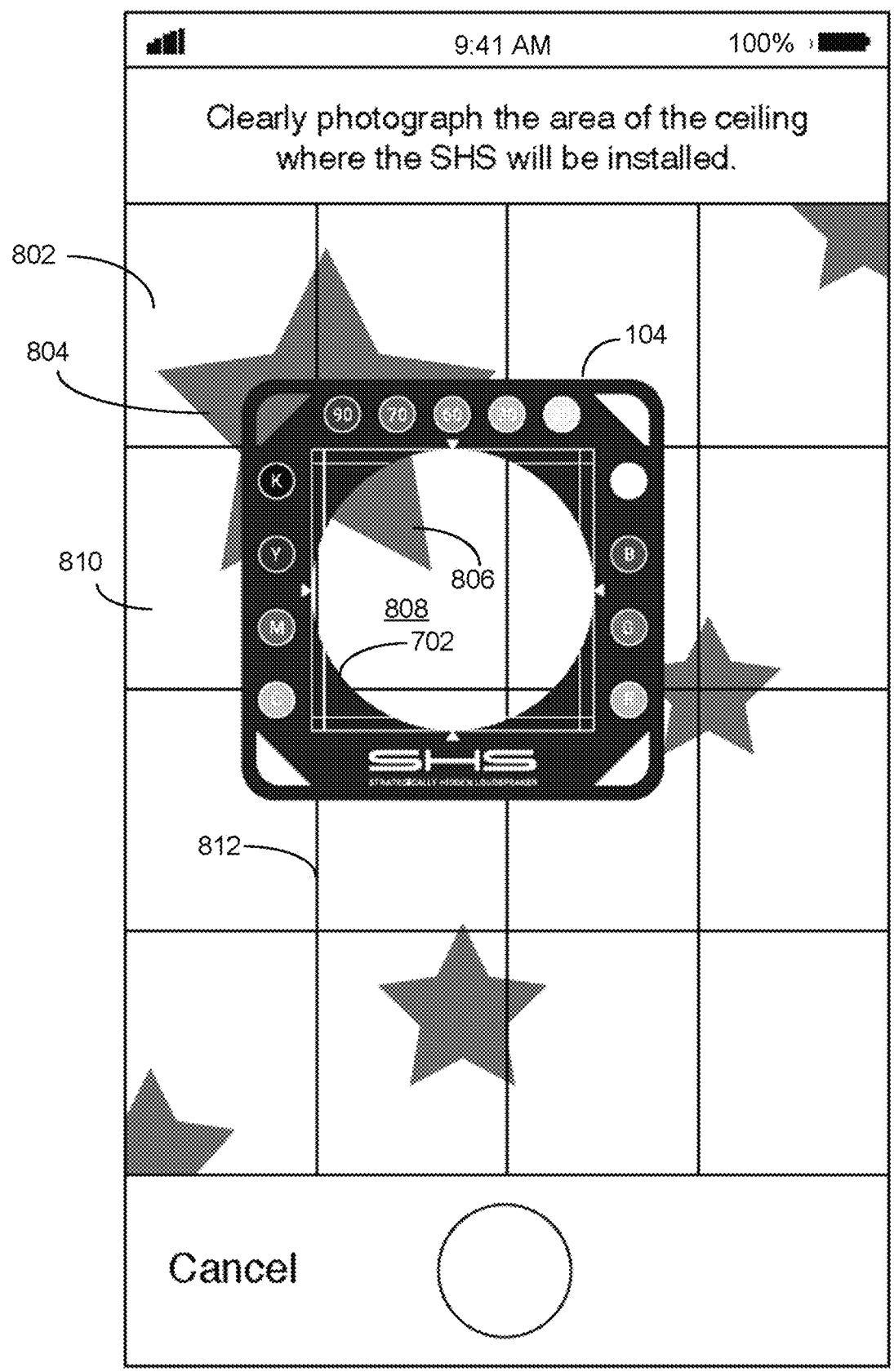
FIG. 8 is a bottom plan view illustrating the exemplary embodiment of the exemplary color calibration template pattern recorder for strategically hidden speakers system of FIG. 1 installed on a ceiling, according to a preferred embodiment of the present invention.

FIG. 8 is a bottom plan view illustrating the exemplary embodiment of a fourth screen 810 of the application 606 showing the exemplary color calibration template 104 pattern recorder for strategically hidden speakers system 100 of FIG. 1 installed on a ceiling 802 and being photographed, according to a preferred embodiment of the present invention. The template 104 is shown trough camera 602 adhered to ceiling 802 with a ceiling portion 808, an inner circular portion of which will be cut out to install the Small ceiling speaker system 118. Ceiling 802 has a pattern 804 and a portion 806 of that pattern is within circular opening 702. The rectangular grid lines 812 in the illustration do not represent ceiling tile boundaries, but are optical guides 812 created by application 606 that may distort when the camera 602 is not facing straight up.

Figure 9:
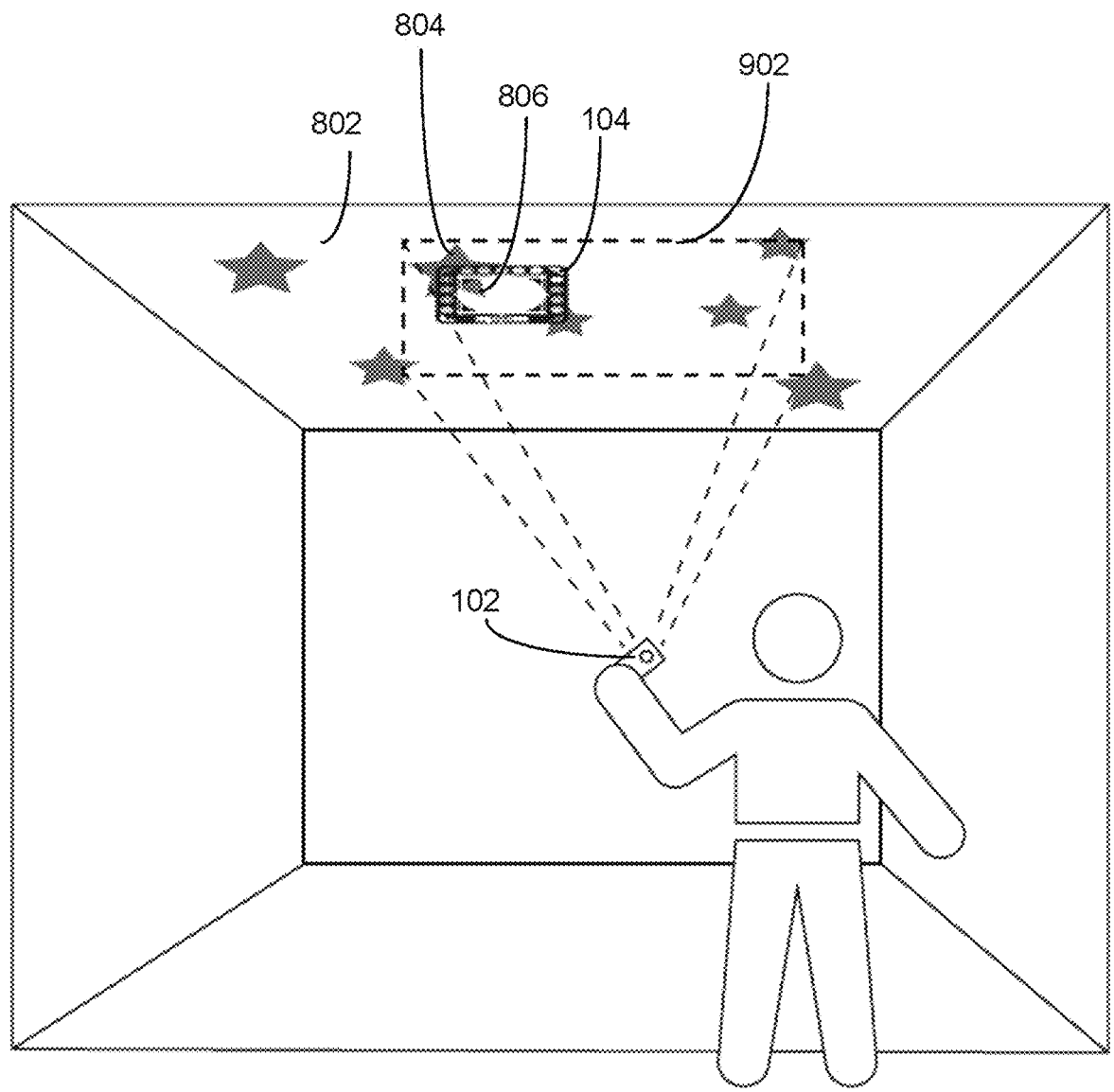
FIG. 9 is a diagrammatic view illustrating an exemplary embodiment of a recording step of the pattern recorder for strategically hidden speakers system of FIG. 1, according to a preferred embodiment of the present invention.

FIG. 9 is a diagrammatic view illustrating an exemplary embodiment of a recording step 206 of the pattern recorder for strategically hidden speakers system 100 of FIG. 1, according to a preferred embodiment of the present invention. Smart phone 102 with application 606 is used to photograph the template 104 and ceiling 802 within boundary 902

Figure 10:
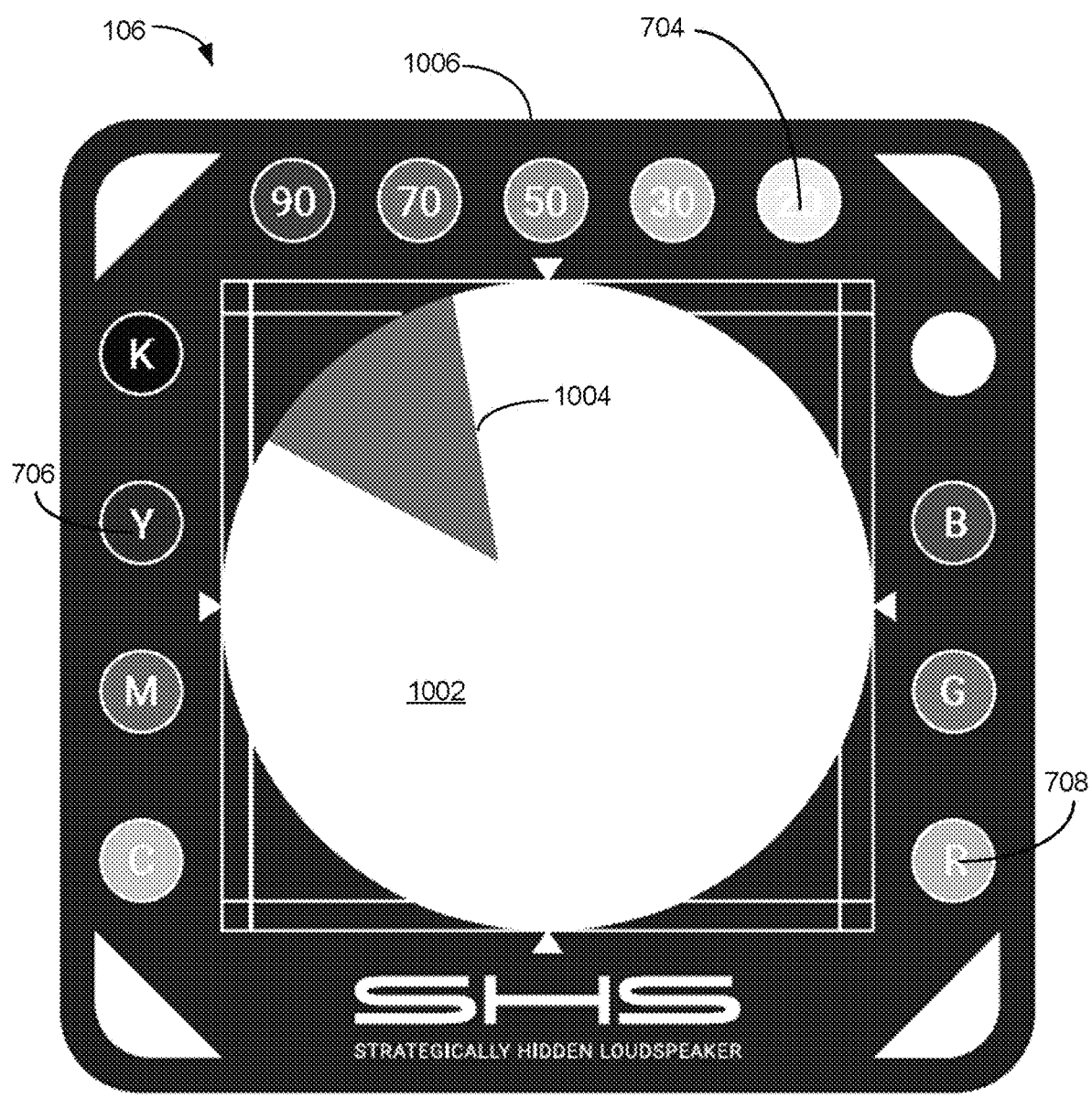
FIG. 10 is a plan view illustrating an exemplary photograph produced by the exemplary embodiment of the pattern recorder for strategically hidden speakers system of FIG. 1, according to a preferred embodiment of the present invention.

FIG. 10 is a plan view illustrating an exemplary photograph 106 produced by the exemplary embodiment of the pattern recorder for strategically hidden speakers system 100 of FIG. 1, according to a preferred embodiment of the present invention. The photograph 106 has captured an image 1004 of the pattern 804, an image 1002 of the ceiling portion 808, and an image 1006 of the template 104.

Figure 11A:
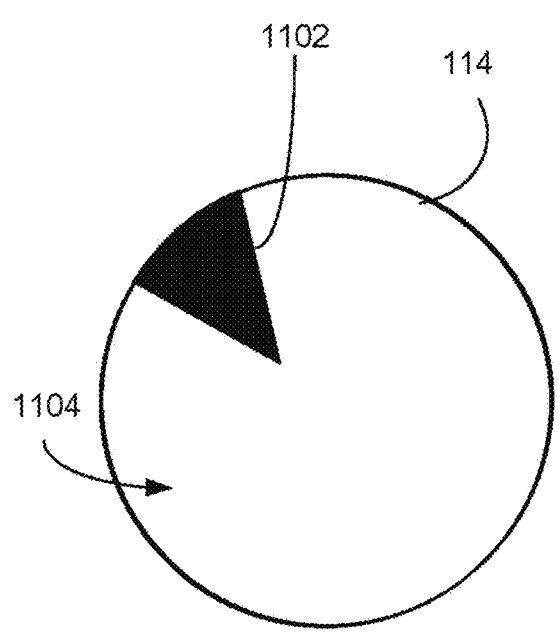
FIG. 11A is a bottom plan view illustrating an exemplary printed steel disc of the exemplary embodiment of the pattern recorder for strategically hidden speakers system of FIG. 1, according to a preferred embodiment of the present invention.

FIG. 11A is a bottom plan view illustrating an exemplary printed steel disc 114 of the exemplary embodiment of the pattern recorder for strategically hidden speakers system 100 of FIG. 1, according to a preferred embodiment of the present invention. The entire bottom surface of printed steel disc 114 is printed, including a portion 1102 of the pattern 806. Printed steel disc 114 has a larger diameter than opening 1110 (see FIG. 11B) in printed ring 115.

Figure 11B:
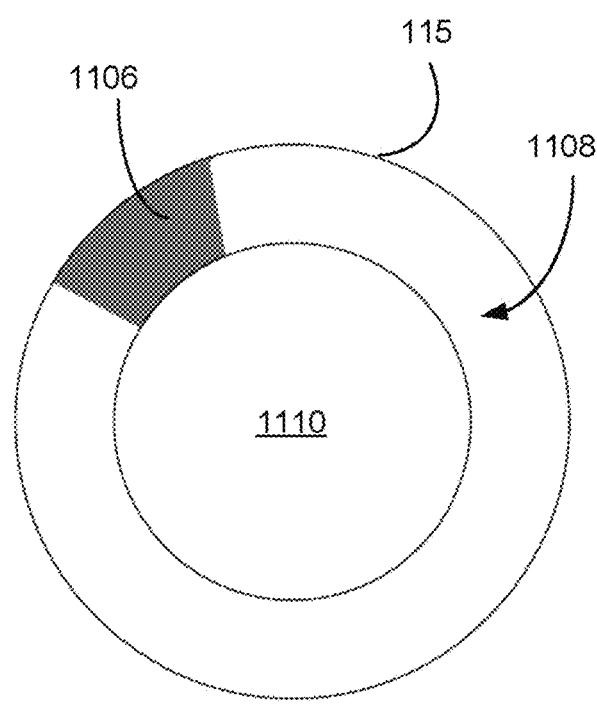
FIG. 11B is a bottom plan view illustrating an exemplary printed steel ring of the exemplary embodiment of the pattern recorder for strategically hidden speakers system of FIG. 1, according to a preferred embodiment of the present invention.

FIG. 11B is a bottom plan view illustrating an exemplary printed steel ring 115 of the exemplary embodiment of the pattern recorder for strategically hidden speakers system 100 of FIG. 1, according to a preferred embodiment of the present invention. The entire bottom surface 1108 of printed steel ring 115 is printed, including a portion 1106 of the pattern 806.

Figure 12:
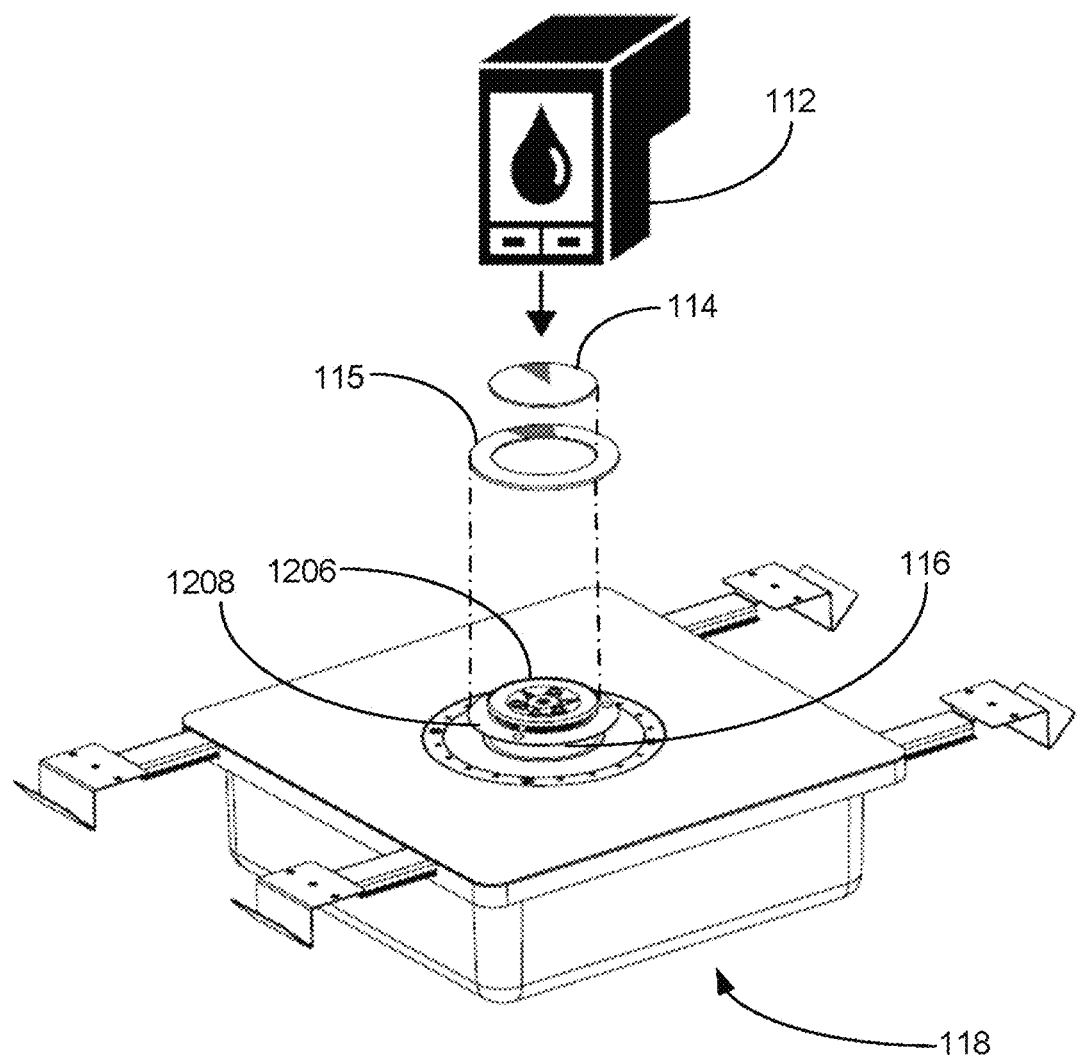
FIG. 12 is an exploded perspective diagrammatic view illustrating an exemplary embodiment of the printing and assembly process of the exemplary embodiment of the pattern recorder for strategically hidden speakers system of FIG. 1, according to a preferred embodiment of the present invention.

FIG. 12 is an exploded perspective diagrammatic view illustrating an exemplary embodiment of the printing and assembly process of the exemplary embodiment of the pattern recorder for strategically hidden speakers system 100 of FIG. 1, according to a preferred embodiment of the present invention. Printer 112 is specially adapted for printing on metal discs 122 and rings 124. Printer 112 prints the color-corrected image on the steel ring 124 and the steel disc 122. While steel is a preferred material for rings 124 and discs 122, various other magnetically attracted materials may be used in respective various embodiments. Small ceiling speaker system 118, shown upside down, has an acoustic channel shell (not visible in this view) extending through a bottom opening to slidingly engage and threadingly retain diffuser 116.

Figure 13:
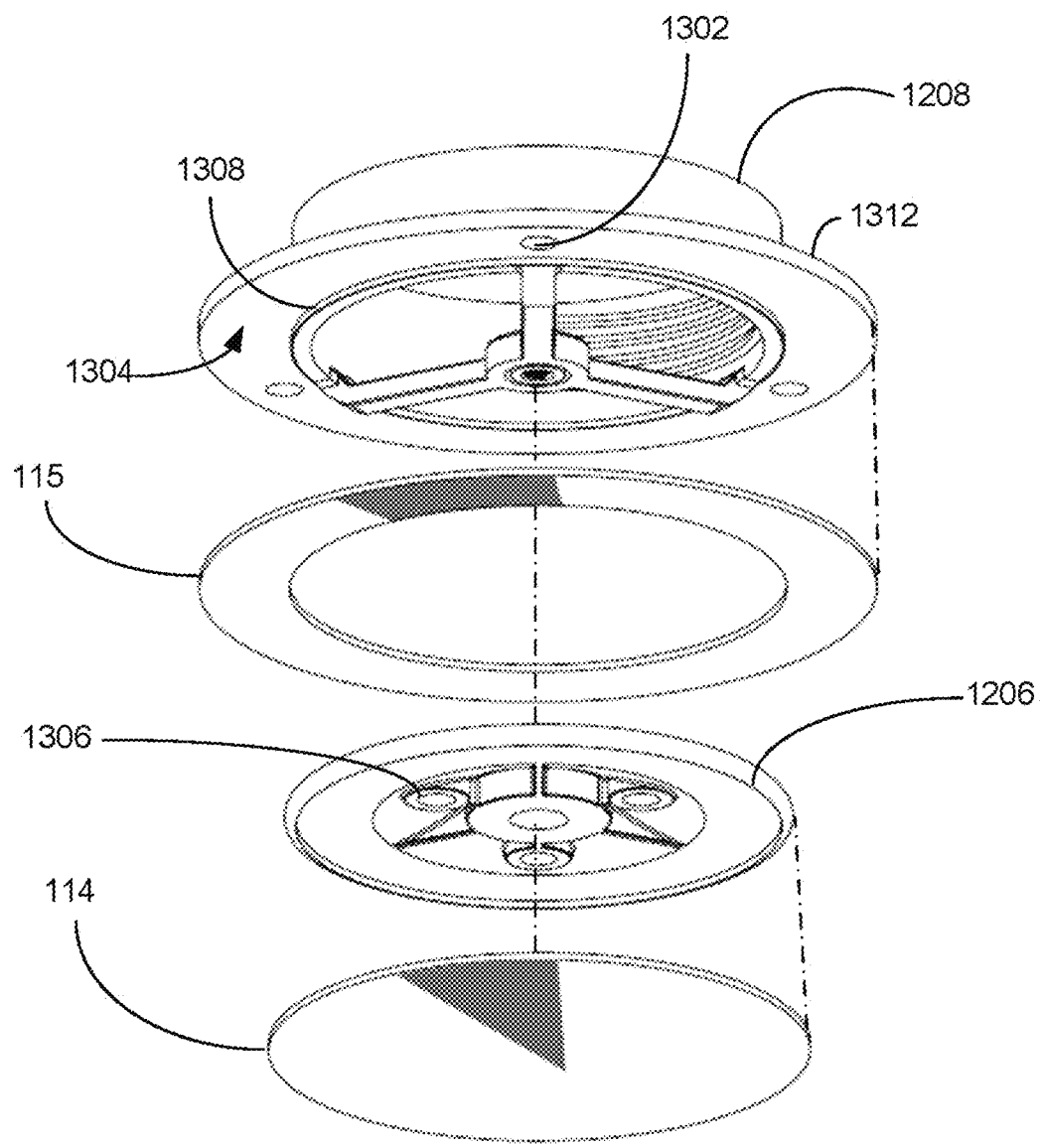
FIG. 13 is an exploded bottom perspective view illustrating an exemplary embodiment of a diffuser and printed steel of the exemplary embodiment of the pattern recorder for strategically hidden speakers system of FIG. 1, according to a preferred embodiment of the present invention.

FIG. 13 is an exploded bottom perspective view illustrating an exemplary embodiment of a diffuser and printed steel of the exemplary embodiment of the pattern recorder for strategically hidden speakers system of FIG. 1, according to a preferred embodiment of the present invention. Printed ring 115 must be installed on the annular flange 1312 (see FIG. 13) of the acoustic channel interface 1208 before of diffuser element 1206 is attached to the acoustic channel interface. Annular bottom flange 1312 has a bottom surface 1304 in which three magnets 1302 (one of three labeled) are flush mounted to magnetically attach printed steel ring 115. Diffuser element 1206 supports three magnets 1306 to magnetically attach printed steel disc 114.

Figure 14:
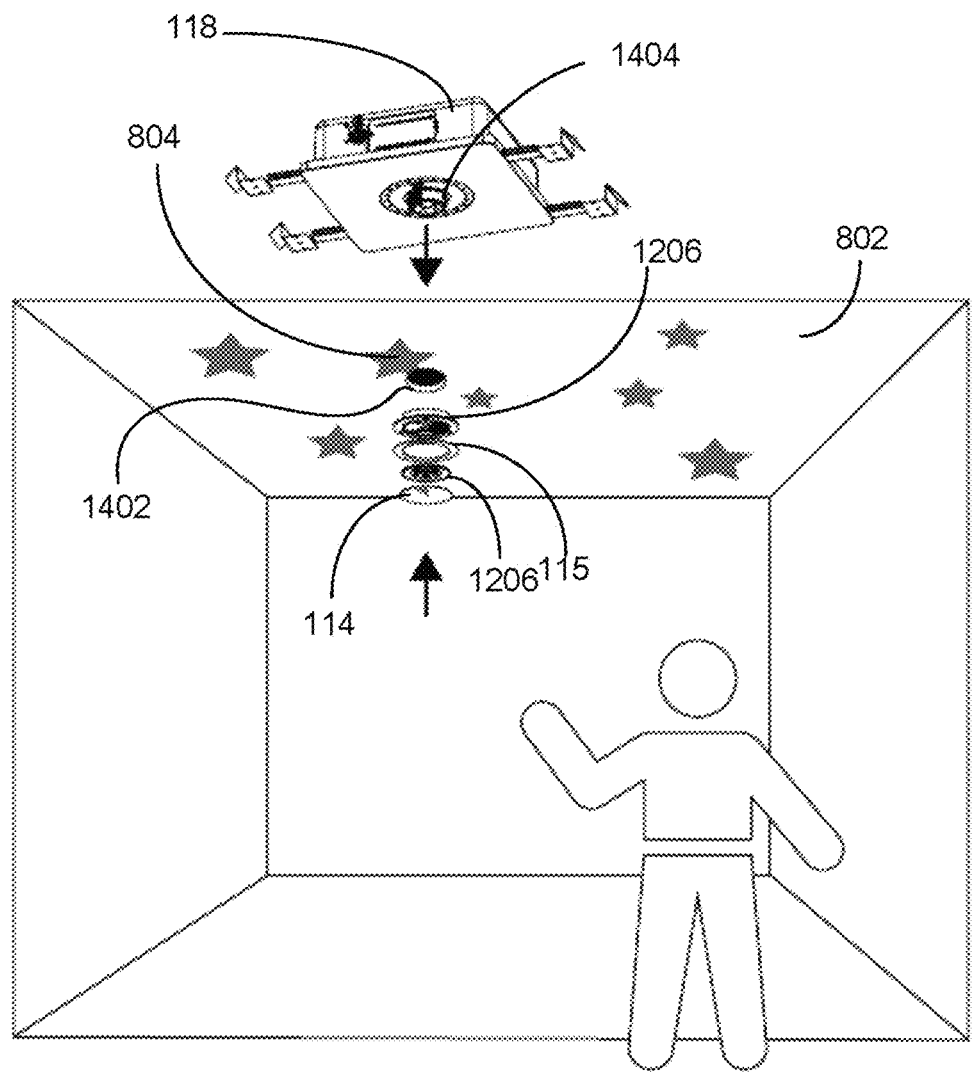
FIG. 14 is a diagrammatic view illustrating an exemplary embodiment of the installation process of the patterned diffuser of the exemplary embodiment of the pattern recorder for strategically hidden speakers system of FIG. 1, according to a preferred embodiment of the present invention.

FIG. 14 is a diagrammatic view illustrating an exemplary embodiment of the installation process of the patterned diffuser 114, 1206, 115, and 1208 of the exemplary embodiment of the pattern recorder for strategically hidden speakers system 100 of FIG. 1, according to a preferred embodiment of the present invention. Small ceiling speaker system 118 is shown above ceiling 802 with acoustic channel shell 1404 extended to fit through ceiling hole 1402 and receive acoustic channel interface 1208. Printed ring 115 is aligned to attached to rim 1312 of acoustic channel interface 1208. Diffuser element 1206 is positioned to attach to acoustic channel interface 1208.

Figure 15:
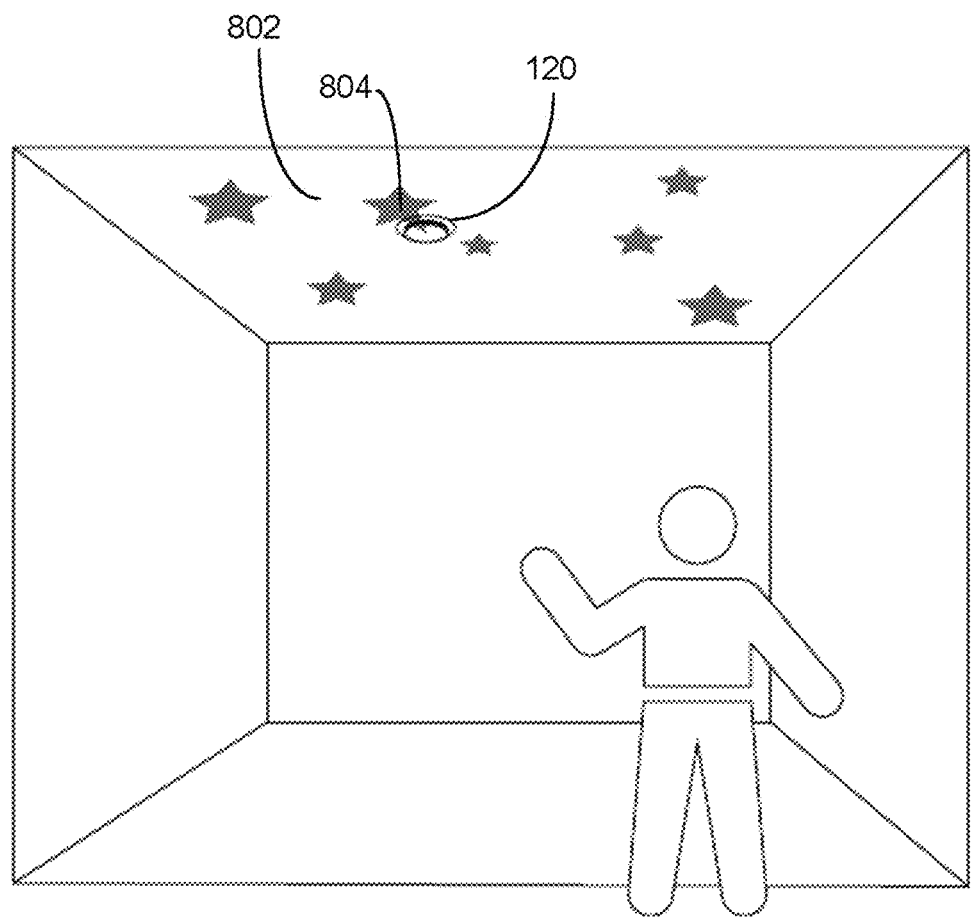
FIG. 15 is a diagrammatic view illustrating an exemplary embodiment of the installed patterned diffuser produced by the exemplary embodiment of the pattern recorder for strategically hidden speakers system of FIG. 1, according to a preferred embodiment of the present invention.

FIG. 15 is a diagrammatic view illustrating an exemplary embodiment of the installed SHS 120 produced by the exemplary embodiment of the pattern recorder for strategically hidden speakers system 100 of FIG. 1, according to a preferred embodiment of the present invention. The SHS 120 blends in with the pattern 804 of the ceiling 802. Pattern 804 is simplified for purposes of illustration. SHS 120 works on very complex patterns, such as murals and frescos.

We claim:

1. A pattern recorder for strategically hidden speakers system comprising:
    a. a smart phone comprising a camera, a wireless communicator, and an application operable to provide pattern recording instructions to a user and respond to selected responses by a user;
    b. a computer capable of wireless communication with said wireless communicator and having a program operable for color correcting digital images;
    c. a color calibration template, having a releasable adhesive backing, that assists said program to correct colors in a digital image that includes an image of said calibration template, communicated from said camera via said wireless communicator; and
    d. a printer operable receive said color corrected digital image from said computer and to print said color corrected digital image onto an annular steel ring and onto a steel disc.

2. The pattern recorder for strategically hidden speakers system of claim 1, comprising a pattern from a first portion of a ceiling printed on said annular steel ring.

3. The pattern recorder for strategically hidden speakers system of claim 2, comprising a pattern from a second portion of a ceiling printed on said steel disc.

4. The pattern recorder for strategically hidden speakers system of claim 3, wherein:
    a. said printed said second portion partially overlaps said printed first portion; and
    b. said first printed portion may be aligned to said second printed portion.

5. The pattern recorder for strategically hidden speakers system of claim 1, wherein said steel ring is
    a. a printed said steel ring magnetically attached to a flange of a diffuser; and
    b. manually rotatable about a central vertical axis of said diffuser to align said printing to a pattern on said ceiling.

6. The pattern recorder for strategically hidden speakers system of claim 1, wherein said steel disc is
   a. a printed said steel disc magnetically attached to a bottom of a diffuser element; and
   b. manually rotatable about a central vertical axis of said diffuser to align printing to a pattern on said printed steel ring.

7. The pattern recorder for strategically hidden speakers system of claim 1, wherein said color calibration template:
   a. is releasably adherable to a ceiling; and
   b. has a circular opening that has a diameter related to a diameter of a hole in a ceiling tile where said strategically hidden speakers system is to be installed.

8. The pattern recorder for strategically hidden speakers system of claim 7 comprising:
   a. a first plurality of RGB color calibrations on said color calibration template;
   b. a second plurality of CMYK color calibrations on said color calibration template;
   c. a third plurality of grayscale calibrations on said color calibration template; and
   d. a plurality of scaling lines on said color calibration template.

9. The pattern recorder for strategically hidden speakers system of claim 8, wherein said smart phone comprises storage for digital images and said storage contains an image that includes an image of said color calibration template.

10. A pattern recorder for strategically hidden speakers system comprising:
    a. a smart phone comprising a camera, a wireless communicator, and an application operable to provide instructions pattern recording to a user and respond to selected responses by a user;
    b. a computer capable of wireless communication with said wireless communicator and having a program operable for color correcting digital images;
    c. a color calibration template, having a releasable adhesive backing, that assists said program to correct colors in a digital image that includes an image of said color calibration template, communicated from said camera via said wireless communicator;
    d. wherein said color calibration template is releasably adherable to a ceiling; and
    e. a printer operable receive said color corrected digital image from said computer and to print said color corrected digital image onto an annular steel ring and onto a steel disc.

11. The pattern recorder for strategically hidden speakers system of claim 10, comprising:
    a. a pattern from a first portion of a ceiling printed on said annular steel ring; and
    b. a pattern from a second portion of a ceiling printed on said steel disc.

12. The pattern recorder for strategically hidden speakers system of claim 11, wherein said printed second portion partially overlaps said printed first portion.

13. The pattern recorder for strategically hidden speakers system of claim 11, wherein:
    a. said steel ring is:
       i. a printed said steel ring magnetically attached to a flange of a diffuser; and
       ii. manually rotatable about a central vertical axis of said diffuser to align said printed ring to a pattern on said ceiling; and
    b. said steel disc is
       i. a printed said steel disc magnetically attached to a bottom of a diffuser element; and
       ii. manually rotatable about a central vertical axis of said diffuser to align said printed steel disc to a pattern on said printed steel ring.

14. The pattern recorder for strategically hidden speakers system of claim 10 comprising:
    a. a first plurality of RGB color calibrations on said color calibration template;
    b. a second plurality of CMYK color calibrations on said color calibration template;
    c. a third plurality of grayscale calibrations on said color calibration template;
    d. a circular opening in said color calibration template; and
    e. a plurality of scaling lines on said color calibration template.

15. The pattern recorder for strategically hidden speakers system of claim 10, wherein said smart phone comprises storage for digital images and said storage contains a digital image that includes an image of said color calibration template.

16. The pattern recorder for strategically hidden speakers system of claim 15, wherein said digital image includes an image of a portion of a ceiling.

17. A pattern recorder for strategically hidden speakers system comprising:
    a. a smart phone comprising a camera, a wireless communicator, a memory, and an application operable to provide pattern recording instructions to a user and respond to selected responses by a user;
    b. a computer capable of wireless communication with said wireless communicator and having a program operable to correct color digital images;
    c. a color calibration template, having a releasable adhesive backing, that enables said program to correct colors in a digital image that includes an image of said color calibration template, communicated from said memory via said wireless communicator;
    d. wherein said color calibration template is releasably adherable to a ceiling;
    e. a printer operable to receive said color corrected digital image from said computer and to print said color corrected digital image onto an annular steel ring and onto a steel disc;
    f. a pattern from a first portion of a ceiling printed on said annular steel ring;
    g. a pattern from a second portion of a ceiling printed on said steel disc; and
    h. wherein said printed said second portion partially overlaps said printed first portion.

18. The pattern recorder for strategically hidden speakers system of claim 17, wherein:
    a. said print on said printable surface of said disc corresponds to at least one of:
       i. a pattern on said ceiling; and
       ii. said print on said ring; and
    b. said print on said printable surface of said ring corresponds to at least one of:
       i. a pattern on said ceiling; and
       ii. said print on said disc.

19. The pattern recorder for strategically hidden speakers system of claim 10 comprising:
    a. a first plurality of RGB color calibrations on said color calibration template;
    b. a second plurality of CMYK color calibrations on said color calibration template;
    c. a third plurality of grayscale calibrations on said color calibration template;

d. a circular opening in said color calibration template; and
e. a plurality of scaling lines on said color calibration template.

20. The pattern recorder for strategically hidden speakers system of claim 10, wherein:
   a. said smart phone comprises storage for digital images and said storage contains a digital image that includes an image of said color calibration template; and
   b. said digital image includes an image of a portion of a ceiling.

\* \* \* \* \*